Patented Dec. 27, 1938

2,141,929

UNITED STATES PATENT OFFICE 2,141,929

ARC WELDING FLUX

March Rudolph Moritz, Sale Moor, England, assignor to General Electric Company, a corporation of New York No Drawing. Application December 14, 1936, Serial No. 115,885. In Great Britain January 8, 1936

4 Claims. (Cl. 219—8)

My invention relates to arc welding fluxes and more particularly to flux coated metallic arc welding electrodes.

In metallic arc welding, the weld is produced through the agency of an arc established between the work and a metal rod or pencil commonly referred to as an electrode. By associating certain materials with the electrode the operating characteristics of the welding arc and the quality of the weld metal deposited are greatly improved. Such materials are referred to as fluxes.

It is an object of my invention to provide a flux for use in arc welding stainless steels.

It is a further object of my invention to provide a stainless steel electrode having a flux coating of an improved composition.

Further objects of my invention will become apparent from a consideration of the following description thereof.

The fluxing material of my invention comprises a mixture of cryolite, feldspar, talc, calcium carbonate. When this flux is applied as a coating to an electrode a binder is added. Suitable binders which may be utilized are, for example, sodium silicate, gum arabic, ethyl orthosilicate, and the like.

The flux as an electrode coating may have the following composition by weight:

|  | Percent |
|---|---|
| Cryolite | 56 to 64 |
| Feldspar | 22 to 18 |
| Talc | 11 to 9 |
| Calcium carbonate | 11 to 9 | with enough sodium silicate or other binder to provide a paste of suitable consistency.

Where my improved flux is employed for coating welding electrodes, the welding wire or rod is preferably provided with a fibrous covering and the flux is applied to this covering by a process of extrusion. The fibrous covering is preferably a blue or white asbestos helical winding, the turns of which are spaced from one another. Such a winding serves to center the core rod in the extruding die by means of which the flux is applied as a covering to the rod between the open spirals. It also adds an additional ingredient to the slag deposited during welding.

The electrode wire or rod may have the following composition by weight:

|  | Percent |
|---|---|
| Chromium | 19 to 21 |
| Nickel | 8.5 to 9.5 |
| Silicon | 1.8 to 2.2 |
| Carbon | 0.09 to 0.11 |
| Manganese | 0.4 to 0.6 |
| Iron | The remainder |

With the above core rod and flux the physical properties of the deposited weld metal are as follows:

| Yield point | tons per sq. in | 35 |
|---|---|---|
| Ultimate tensile | tons per sq. in | 45 |
| Elongation | on $4\sqrt{\text{area}}$ percent | 35 |
| Reduction of area | percent | 40 |
| Specific gravity |  | 7.78 | and the chemical analysis of the deposited weld metal is:

|  | Percent |
|---|---|
| Chromium | 18 to 19.5 |
| Nickel | 7.8 to 8.5 |
| Silicon | 1.2 to 1.4 |
| Carbon | 0.06 |

Electrodes embodying my invention will weld "18–8" stainless steels, "12–14" chromium stainless steels, and other stainless irons and steels including clad steels having a chromium content not exceeding 20%. The parts to be welded are preferably placed in a horizontal position with their edges beveled to form a 60° to 70° V. This horizontal positioning of the work is desirable due to the fluidity of the molten weld metal deposited.

It is preferable to use a direct current source of welding current and to connect the electrode to the positive terminal thereof. The welding arc should be maintained as short as possible to avoid atmospheric contamination of the weld metal.

The electrode gives good penetration and produces a deposit which is free from undercutting. The slag deposit on the weld metal during the welding operation is easily removed therefrom after it has solidified.

Due to the high resistance of the electrode wire or rod, it is desirable to use during welding only a portion of each of a plurality of rods which are used in sequence. For example, six electrodes may be employed at the same time and used in sequence, depositing from each electrode a few inches thereof and then substituting another electrode while the electrode that has just been used is laid aside to cool.

Best results are obtained by inclining the electrode in the direction of welding so that it makes an angle of about 80° with horizontally disposed work parts.

To obtain best results it is desirable when welding thick parts to deposit a large number of beads from small gauge electrodes rather than to use a lesser number of beads from larger gauge electrodes.

Although I prefer to use my above referred to flux as a coating on welding electrodes, my invention is not limited thereto, since beneficial results may also be obtained by placing it on the work to be welded. It is also apparent that certain fillers or diluents may be added to my flux without departing from my invention.

What I claim as new and desire to secure by Letters Patent of the United States is:

1. A flux for use in arc welding having substantially the following composition by weight:

|  | Per cent |
|---|---|
| Cryolite | 56 to 64 |
| Feldspar | 22 to 18 |
| Talc | 11 to 9 |
| Calcium carbonate | 11 to 9 |

2. A stainless steel electrode having a flux coating of substantially the following composition by weight:

|  | Per cent |
|---|---|
| Cryolite | 56 to 64 |
| Feldspar | 22 to 18 |
| Talc | 11 to 9 |
| Calcium carbonate | 11 to 9 | and a binder.

3. A stainless steel electrode having fibrous covering of asbestos and a flux coating of substantially the following composition by weight:

|  | Per cent |
|---|---|
| Cryolite | 56 to 64 |
| Feldspar | 22 to 18 |
| Talc | 11 to 9 |
| Calcium carbonate | 11 to 9 | and a binder.

4. An electrode having a core rod of substantially the following composition by weight:

|  | Per cent |
|---|---|
| Chromium | 19 to 21 |
| Nickel | 8.5 to 9.5 |
| Silicon | 1.8 to 2.2 |
| Manganese | 0.4 to 0.6 |
| Iron | The remainder | provided with a covering of substantially the following composition by weight:

|  | Per cent |
|---|---|
| Cryolite | 56 to 64 |
| Feldspar | 22 to 18 |
| Talc | 11 to 9 |
| Calcium carbonate | 11 to 9 | and a binder.

MARCH RUDOLPH MORITZ.